US011961343B2

(12) United States Patent
Davidson

(10) Patent No.: US 11,961,343 B2
(45) Date of Patent: Apr. 16, 2024

(54) LOCK

(71) Applicant: D & D Design and Manufacturing, Inc., Oklahoma City, OK (US)

(72) Inventor: Robin D. Davidson, Wheatland, OK (US)

(73) Assignee: D & D Design and Manufacturing, Inc., Oklahoma City, OK (US)

( * ) Notice: Subject to any disclaimer, the term of this patent is extended or adjusted under 35 U.S.C. 154(b) by 465 days.

(21) Appl. No.: 17/228,963

(22) Filed: Apr. 13, 2021

(65) Prior Publication Data

US 2022/0327874 A1 Oct. 13, 2022

(51) Int. Cl.

*G07C 9/00* (2020.01)
*E05B 47/00* (2006.01)
*E05B 67/36* (2006.01)

(52) U.S. Cl.

CPC ..... *G07C 9/00182* (2013.01); *G07C 9/00563* (2013.01); *E05B 47/0001* (2013.01); *E05B 67/36* (2013.01)

(58) Field of Classification Search

CPC .......... E05B 67/24; E05B 67/03; E05B 67/00; E05B 67/063; E05B 67/22; E05B 67/36; E05B 67/365; E05B 2047/0073; E05B 2047/0095

See application file for complete search history.

(56) References Cited

U.S. PATENT DOCUMENTS

| | | | | |
|---|---|---|---|---|
| 4,807,454 | A | 2/1989 | Sengupta et al. | |
| 5,417,092 | A * | 5/1995 | Iu | E05B 67/063 70/38 A |
| 8,266,932 | B2 | 9/2012 | Longwell | |
| 8,375,753 | B2 | 2/2013 | Goldman | |
| 9,679,429 | B2 | 6/2017 | Duncan et al. | |
| 11,551,498 | B2 * | 1/2023 | Hage | E05B 67/063 |
| 2005/0103065 | A1 | 5/2005 | Dennis | |
| 2009/0308117 | A1 | 12/2009 | Goldman | |
| 2017/0032710 | A1 | 2/2017 | Debrody et al. | |

* cited by examiner

*Primary Examiner* — Michael P Ferguson
*Assistant Examiner* — Thomas L Neubauer
(74) *Attorney, Agent, or Firm* — Dunlap Codding, P.C.

(57) ABSTRACT

A lock comprising a housing, a plunger, a locking member, a locking plate, and a control assembly. The housing having an internal cavity, a recess, and a bore. The plunger is disposed in the bore and is slidable between a closed position wherein a second end of the plunger is positioned in the internal cavity and an intermediate portion of the plunger extends across the recess, and an open position wherein the plunger is withdrawn from the internal cavity and the recess. The locking member is movable between a locking position wherein the locking member is engaged with the plunger and an unlocking position wherein the locking member is disengaged therefrom. The control assembly operates the locking plate between a lock position to hold the locking member in the locking position and an unlock position to permit the plunger to move from the closed position to the open position.

12 Claims, 11 Drawing Sheets

LOCK

BACKGROUND

A variety of methods have been employed to prevent unauthorized access to containers, vehicles, luggage, rooms, buildings, or pieces of property, for example. These objects or spaces often include lids, covers, doors, or gates held closed using some type of latch mechanism and then secured by a separate locking device, such as a padlock.

A hasp and a staple, for example, are a type of latch used for securing many kinds of objects, such as footlockers, storage containers, and cabinetry. The hasp is a slotted plate attached to one side of an object that fits over a staple attached to another side of the object. Once the staple has been inserted into the slot of the hasp, a shackle of a padlock can be positioned through the opening of the staple, thereby locking the two sides of the object together.

A problem encountered with this method of securing objects is that the latch and locking device remain susceptible to tampering or destruction. The staple of the latch and shackle of the padlock generally have a diameter of less than a quarter of an inch, making these two objects the most vulnerable components when using this type of locking system. Because the staple and the shackle are exposed and accessible, a set of bolt cutters can easily cut through the staple or shackle in a matter of seconds.

Another concern with some locking devices is the potential to defeat the lock through nondestructive means, such as picking the lock. The vast majority of locks used today require the use of a key, combination, or some other physical interaction with an external portion of the lock to unlock the lock. These access points are generally mechanically linked with the locking mechanism internal to the lock and inherently present a vulnerability of the lock. Therefore, an apparatus is needed to address the weaknesses of current locking systems and devices. It is to such a lock that the inventive concepts disclosed herein are directed.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION OF EXEMPLARY EMBODIMENTS

Figure 1:
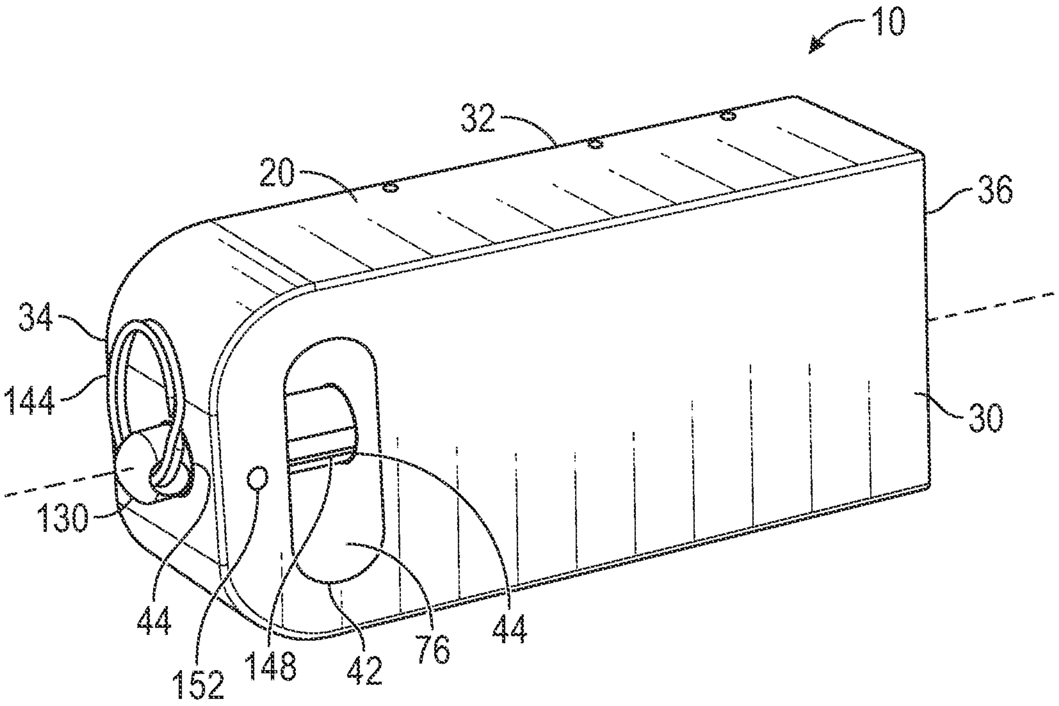
FIG. 1 is perspective view of an exemplary embodiment of a lock in accordance with the inventive concepts disclosed herein.
Figure 2:
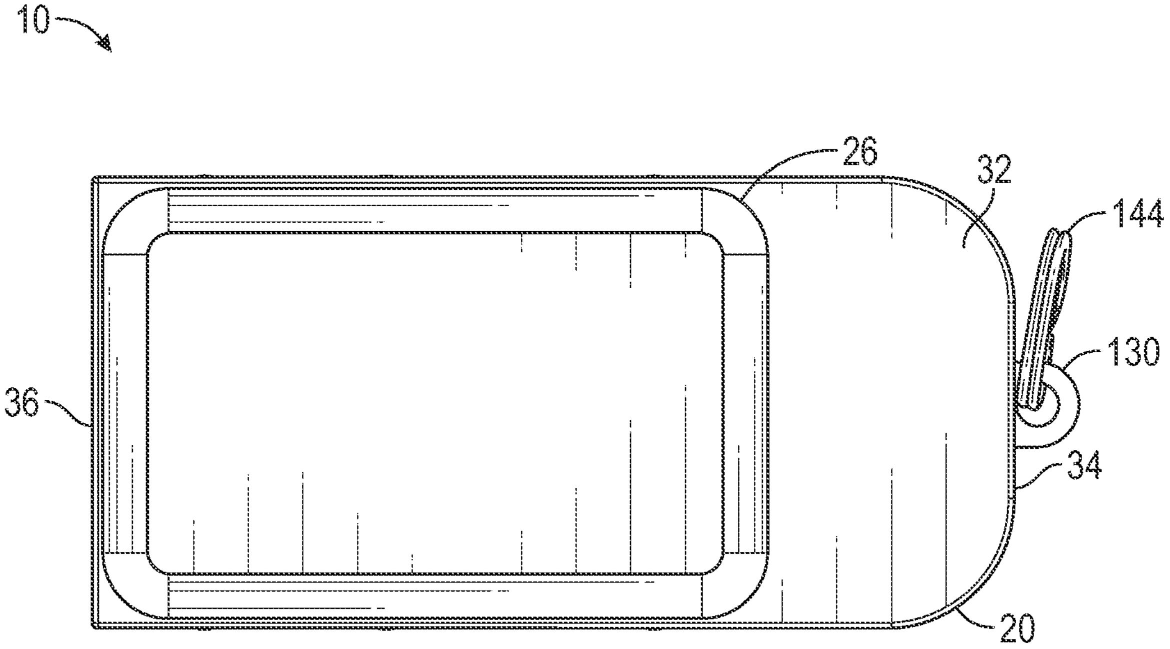
FIG. 2 is a front elevation view of the lock of FIG. 1.
Figure 3:
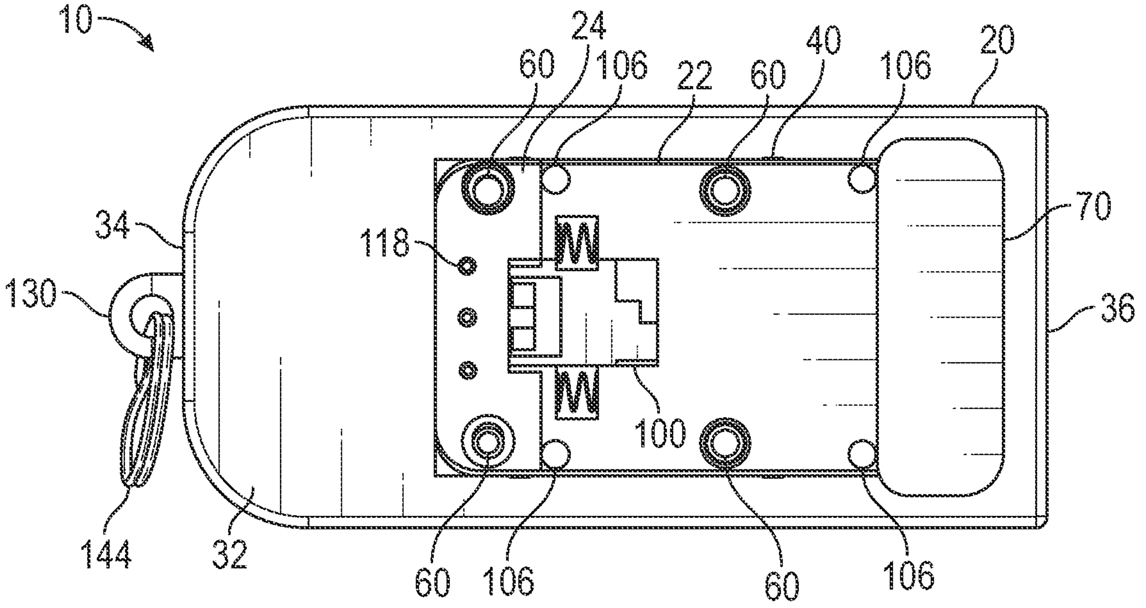
FIG. 3 is a front elevation view of the lock with a housing cover plate removed illustrating an internal cavity of the housing.
Figure 4:
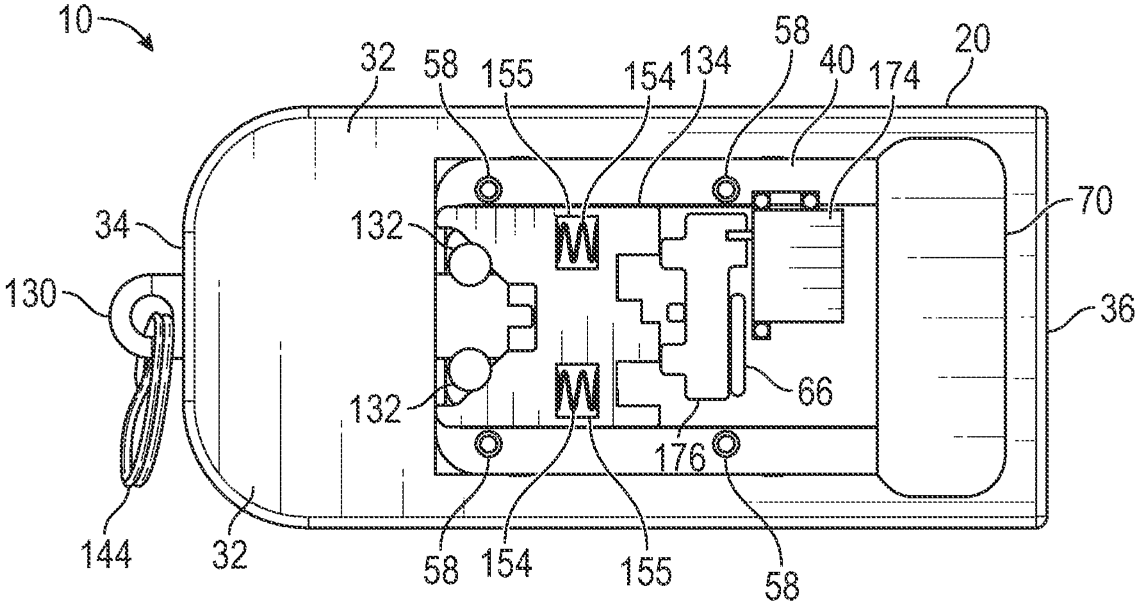
FIG. 4 is a front elevation view of the lock with the housing cover plate, an anti-tampering plate, and a retaining plate removed and illustrating an internal cavity of the housing.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one and any quantity more than one. In addition, the use of the phrase "at least one of X, V, and Z" will be understood to include X alone, V alone, and Z alone, and any combination of X, V, and Z.

The use of ordinal number terminology (i.e., "first", "second", "third", "fourth", etc.) is solely to differentiate between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, FIGS. 1-6 illustrate an exemplary embodiment of a lock 10 in accordance with the inventive concepts disclosed herein. The lock 10 may be used for securing a container, room, building, piece of property, etc. Broadly, the lock 10 comprises a housing assembly 12, a locking assembly 14, and a control assembly 16.

Figure 5:
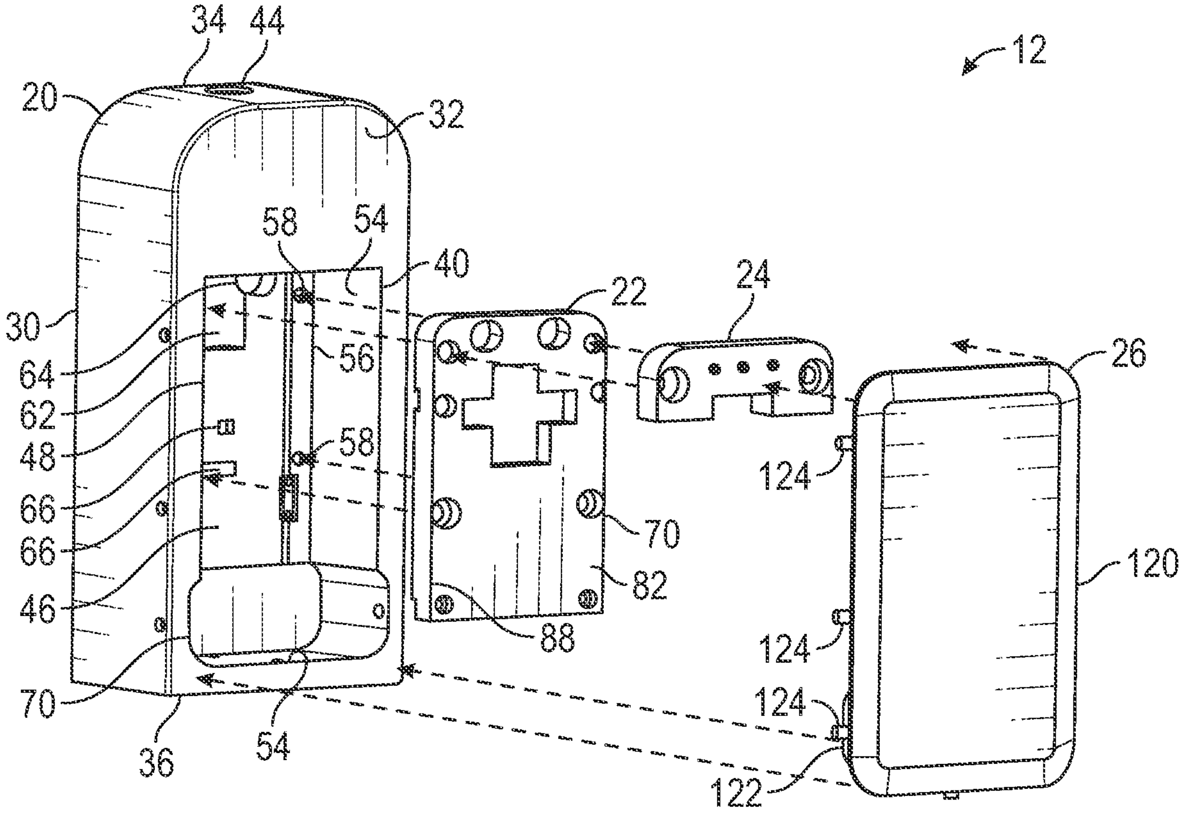
FIG. 5 is an exploded, perspective view of a housing assembly of the lock of FIG. 2.

As best shown in FIG. 5, the housing assembly 12 may include a housing body 20, a retaining plate 22, an anti-tampering plate 24, and a housing cover plate 26. The housing body 20 has a substantially cuboid shape with a first side 30 and a second side 32 opposite the first side 30, and a first end 34 and a second end 36 opposite the first end 34. The housing body 20 may be constructed of metal, such as stainless steel, or of any suitable material for the housing body 20 of the lock 10. In one embodiment, the housing body 20 has a length of approximately 5 inches, a width of approximately 2.5 inches, and a height of approximately 1.5 inches.

Figure 6:
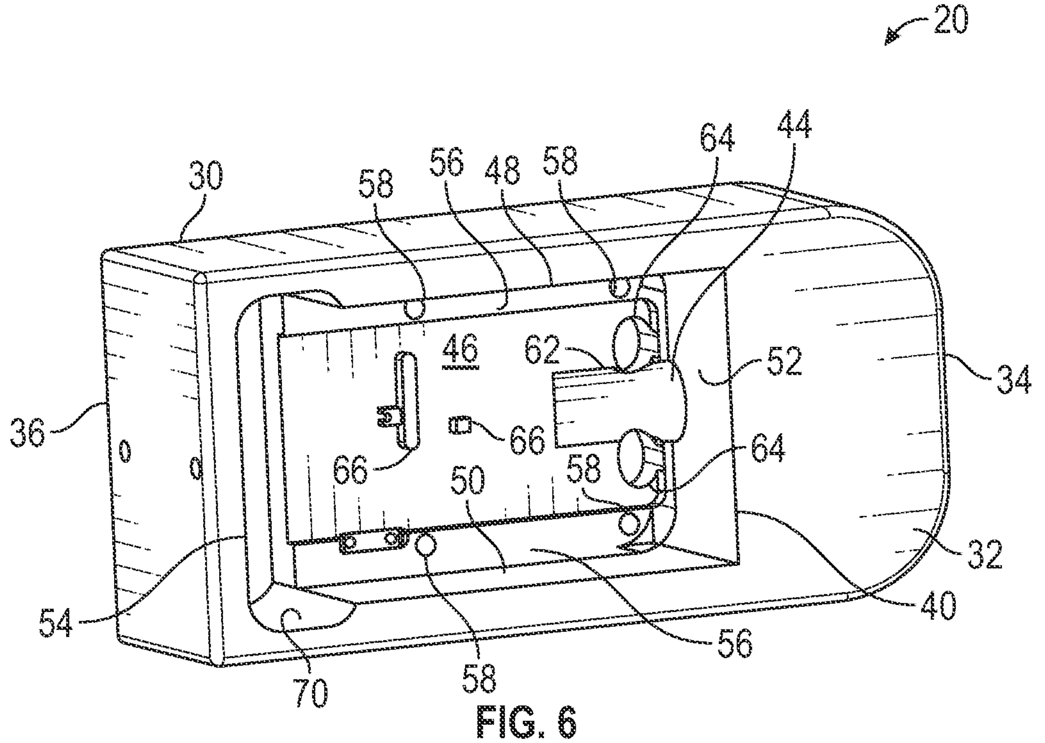
FIG. 6 is a front perspective view of a housing body of the housing assembly.

The housing body 20 has an internal cavity 40 extending from the second side 32 toward the first side 30, a recess 42 extending from the first side 30 toward the second side 32, and a bore 44. The internal cavity 40 of the housing body 20, as shown in FIGS. 5 and 6, is defined by a back wall 46, a first side wall 48, and a second side wall 50 opposite the first side wall 48, and a first end wall 52 and a second end wall 54 opposite the first end wall 52. The back wall 46 may include several features for receiving and supporting the locking assembly 14 and control assembly 16.

In one embodiment, the back wall 46 has a shelf surface 56 providing an elevated surface extending from the back wall 46 toward the second side 32 of the housing body 20. The shelf surface 56 extends longitudinally along the first side wall 48 and the second side wall 50 and extends laterally toward the center of the internal cavity 40. The shelf surface 56 may include a plurality of threaded bores 58 recessed from the shelf surface 56 toward the first side 30 of the housing body 20. Each of the threaded bores 58 are configured to receive a fastener 60 for securing the retaining plate 22 and the anti-tampering plate 24 to the housing body 20. It will be understood that the retaining plate 22 may be connected to the housing body 20 with any suitable fastener, non-exclusive examples of which include bolts, screws, rivets, clamps, or any other connection method, which are well known in the art.

The back wall 46 includes a plunger channel 62 having a concave surface that aligns with at least a portion of the bore 44 and extending from the first end wall 52 toward the second end wall 54. The plunger channel 62 is recessed from the back wall 46 toward the first side of the housing body 20.

The back wall 46 may have at least one locking member channel 64 proximate to the first end wall 52. The locking member channel 64 is a capsule-shaped channel, recessed from the back wall 46 toward the first side of the housing body 20. The locking member channel 64 is proximate to the plunger channel 62 and extends laterally outward toward at least one of the first side wall 48 or the second side wall 50. In one embodiment, the locking member channel 64 intersects the plunger channel 62. In one embodiment, the back wall 46 comprises two locking member channels 64 positioned on diametrically opposing sides of the plunger channel 62.

The back wall 46 may have a plate guide 66 extending from the back wall 46 toward the second side 32 of the housing body 20 an equal distance as the shelf surface 56. The plate guide 66 is operable to support elements of the locking assembly 14 and elements of the control assembly 16, which will be discussed in more detail below.

In one embodiment, the internal cavity 40 further includes a power source compartment 70. The power source compartment 70 may be proximate the second end wall 54. While the power source compartment 70 described and illustrated herein is wider between the first side wall 48 and the second side wall 50 as compared to the other portion of the internal cavity 40, it will be appreciated that the power source compartment 70 may be formed in a variety of shapes and sizes so long as the power source compartment 70 provides adequate space for the elements of the control assembly 16, as discussed below.

Figure 14:
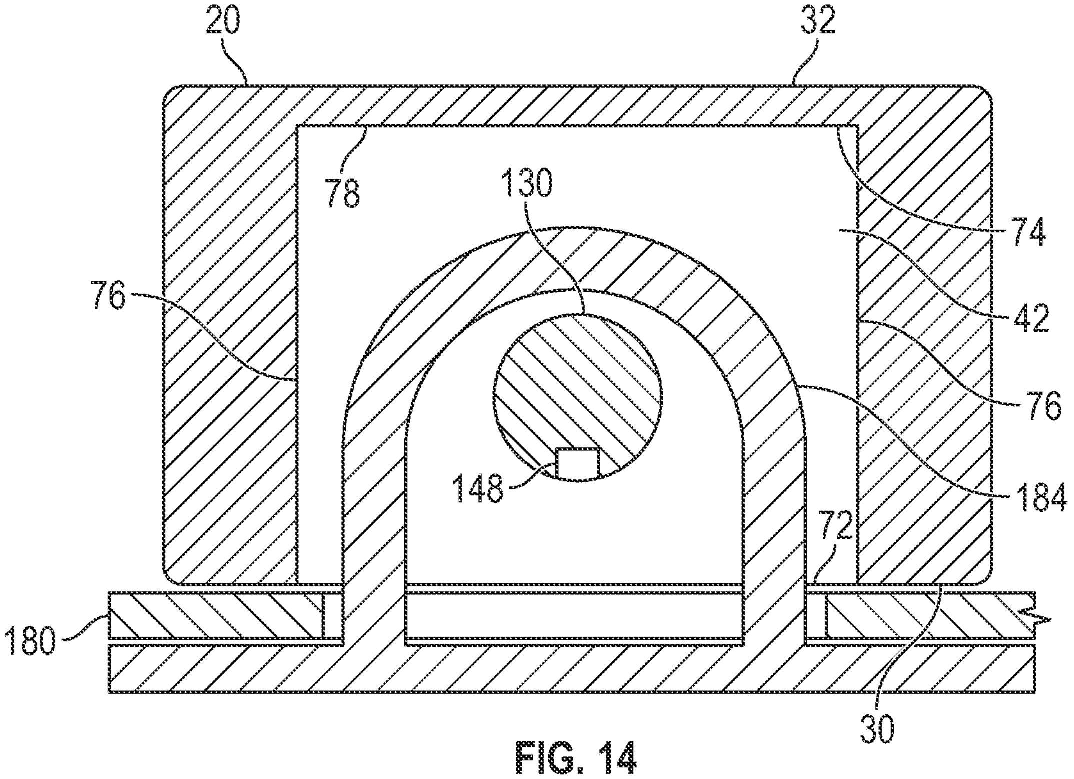
FIG. 14 is a cross-sectional view taken along line 14-14 of FIG. 13B.

As shown in FIG. 1, the recess 42 extends from the first side 30 toward the second side 32 positioned between the first end 34 and the internal cavity 40 of the housing body 20. The recess 42 of the housing has an open end 72 and a closed end 74 opposite the open end ## (See FIG. 14). The recess 42 may be defined by a recess wall 76 extending between the open end 72 and the closed end 74, and a recess back wall 78 proximate to the closed end 74. In the exemplary embodiment, the recess 42 is configured with a stadium or capsule shape; however, other geometries may be used including, but not limited to, rectangular, oval, circular, or triangular. The shape and size of the recess 42 will depend upon the size of objects intended to be inserted into the recess 42 to be secured by the lock 10. In one embodiment, the recess 42 has a lateral dimension of approximately 1.75 inches, a longitudinal dimension of approximately, 0.75 inches, and a depth of approximately 2.25 inches.

The bore 44 extends from the first end 34 toward the second end 36 to intersect the recess 42 and the internal cavity 40. The bore 44 includes a generally circular opening on the first end 34 that aligns with a generally circular opening on the first end wall 52 of the internal cavity 40. The bore 44 having a uniform diameter that is smaller than the lateral dimensions of the recess 42. The bore 44 runs parallel to the first side 30 and the second side 32, and perpendicular to the first end and the second end 36. The bore 44 may be centered between the first side 30 and the second side 32 or may be slightly offset toward the first side 30, as shown in FIG. 5, to provide sufficient space between the bore 44 and the recess back wall 78.

Figure 7A:
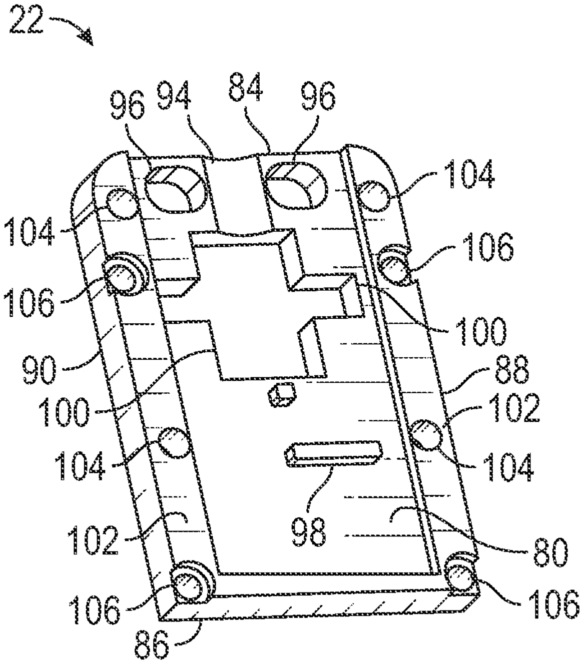
FIG. 7A is a perspective view of a retaining plate of the housing assembly.
Figure 7B:
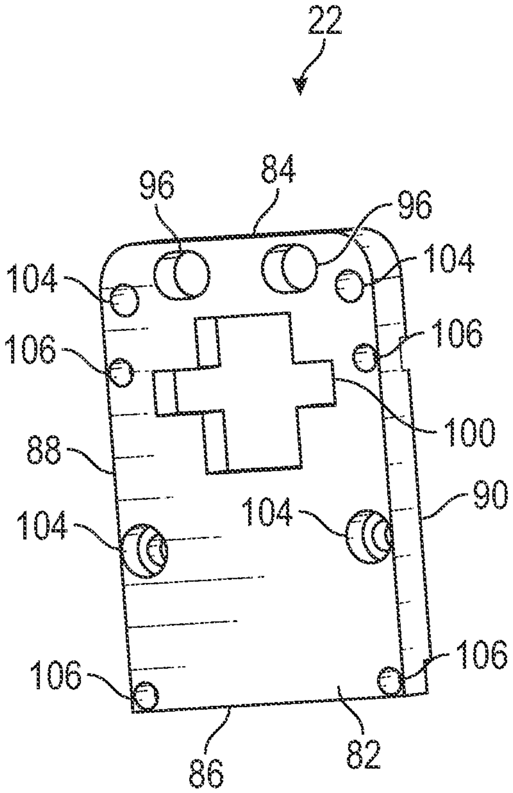
FIG. 7B is a front perspective view of the retaining plate of FIG. 7A.

The retaining plate 22 has a front side 80 and a back side 82 opposite of the front side 80, a first end 84 and a second end 86 opposite of the first end 84, and a first side 88 and a second side 90 opposite the first side 88. The front side 80 of the retaining plate 22 is shown in greater detail in FIG. 7A and the back side 82 of the retaining plate 22 is shown in greater detail in FIG. 7B. The retaining plate 22 may be inserted into the internal cavity 40 of the housing body 20 such that the front side 80 is adjacently disposed with the back wall 46 of the internal cavity 40. The first side 88 and the second side 90 of the retaining plate 22 are positioned proximate to the first side wall 48 and the second side wall 50 of the internal cavity 40, respectively. The first end 84 of the retaining plate 22 is positioned proximate to the first end 34 of the internal cavity 40, whereas the second end 86 of the retaining plate 22 is proximate to the power source compartment 70.

The front side 80 of the retaining plate 22 comprises several features that mirror the back wall 46 of the internal cavity 40. For example, the front side 80 comprises a shelf 92, a plunger channel 94, at least one locking member channels 96, and a plate guide 98. The retaining plate 22 further comprises a cutout 100 extending from the front side 80 through the back side 82, which will be explained in more detail below.

The shelf 102 of the retaining plate 22 is substantially similar to the shelf surface 56 of the back wall 46 of the internal cavity 40. The shelf 102 comprises an elevated surface from the front side 80 extending longitudinally along the first side 88 and the second side 90 of the retaining plate 22 and extending laterally inward toward the center of the retaining plate 22 an equal distance as the shelf surface 56 of the back wall 46. The shelf 102 of the retaining plate 22 is adjacently disposed and in contact with the shelf surface 56 of the back wall 46 creating a space between the back wall 46 and the front side 80 of the retaining plate 22 used to support components of the locking assembly 14 and the control assembly 16, as discussed below.

The shelf 102 includes a plurality of first holes 104 that align with the threaded bores 58 of the shelf surface 56, each of the first holes 104 are configured to receive the fastener 60 to fix the retaining plate 22 to the housing body 20. The shelf 102 may also include a plurality of second holes 106 such that the fasteners 60 may be inserted from the front side through the back side of the retaining plate 22 to fix the components of the control assembly 16 to the housing body 20.

The plunger channel 94 of the retaining plate 22 includes a concave surface that aligns with at least a portion of the bore 44, recessed from the front side 80 toward the back side 82 of the retaining plate 22. The plunger channel 94 extends from the first end 84 toward the second end 86 of the retaining plate 22, substantially mirroring the plunger channel 62 of the back wall 46.

The at least one locking member channels 96 of the retaining plate 22 is a capsule-shaped hole, extending from the front side 80 through the back side 82 of the retaining plate 22. The locking member channel 96 is proximate to and offset from the first end 84 of the retaining plate 22. The locking member channel 96 is proximate to the plunger channel 94 of the retaining plate 22 and extends laterally outward toward at least one of the first side 88 or the second side 90 of the retaining plate 22. In one embodiment, the locking member channel 96 intersect the plunger channel ##. The locking member channel 96 of the retaining plate 22 is offset from and substantially aligned with the locking member channel 64 of the back wall 46. In one embodiment, the retaining plate 22 comprises two locking members channels 96 positioned on diametrically opposing sides of the plunger channel 94 of the retaining plate 22.

The plate guide 98 of the retaining plate 22 extends from the front side 80 of the housing body 20 an equal distance as the shelf 102. The plate guide 98 of the retaining plate 22 mirrors and aligns with the plate guide 66 of the back wall 46 when the retaining plate 22 is inserted into the internal cavity 40. The plate guide 98 is operable to support elements of the locking assembly 14 and elements of the control assembly 16.

Figure 8:
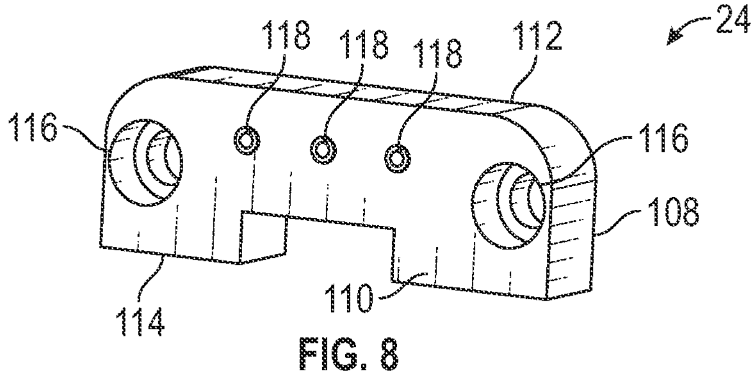
FIG. 8 is a perspective view of an anti-tampering plate of the housing assembly.

The anti-tampering plate 24, as depicted in FIG. 8, has a front side 108 and a back side 110 opposite of the front side 108, a first end 112 and a second end 114 opposite of the first end 112. The anti-tampering plate 24 is positioned with the front side 108 of the anti-tampering plate 24 disposed adjacent and in contact with the back side 82 of the retaining plate 22 with the first end 112 of the anti-tampering plate 24 aligned with the first end 84 of the retaining plate 22. The anti-tampering plate 24 extends from the first end 112 to the second end 114 a sufficient distance to cover the locking member channel 96 of the retaining plate 22. The anti-tampering plate 24 further includes a plurality of holes 116 extending from the back side 110 through the front side 108 that align with the first holes 104 of retaining plate 22 such that the fasteners 60 may be inserted through the holes 116 to secure the anti-tampering plate 24 to the retaining plate 22 and the housing body 20.

In one embodiment, the anti-tampering plate 24 may include at least one anti-tampering member 118 positioned within the anti-tampering plate 24 to inhibit destruction of certain components of the locking assembly 14. For example, in FIG. 8, it is shown that the anti-tampering member 118 may comprise one or more steel slotted spring pins that would impede an attempt to defeat the lock 10 by drilling out at least a portion of the locking assembly, for example.

The housing cover plate 26 comprises a thin, rigid structure having an outer portion 120 and an inner portion 122 configured to restrict access to the internal cavity 40. The outer portion 120 of the housing cover plate 26 having a larger cross-sectional area than the opening of the internal cavity 40 such that the internal cavity 40 may be sealed off as the outer portion 120 is positioned against the second side 32 of the housing body 20. The inner portion 122 having a smaller cross-sectional area than the opening of the internal cavity 40 is positioned within the internal cavity as the housing cover plate 26 covers the internal cavity 40. The housing cover plate 26 may be permanently affixed to the housing body 20, or may be attached to the housing body 20 in such a manner to provide restricted access to the internal cavity 40. For example, in one embodiment, a plurality of securing members 124, such as steel taper pins, may be inserted through the housing body 20 to intersect with the inner portion 122 positioned within the internal cavity 40 to secure the housing cover plate 26 in place.

Figure 9B:
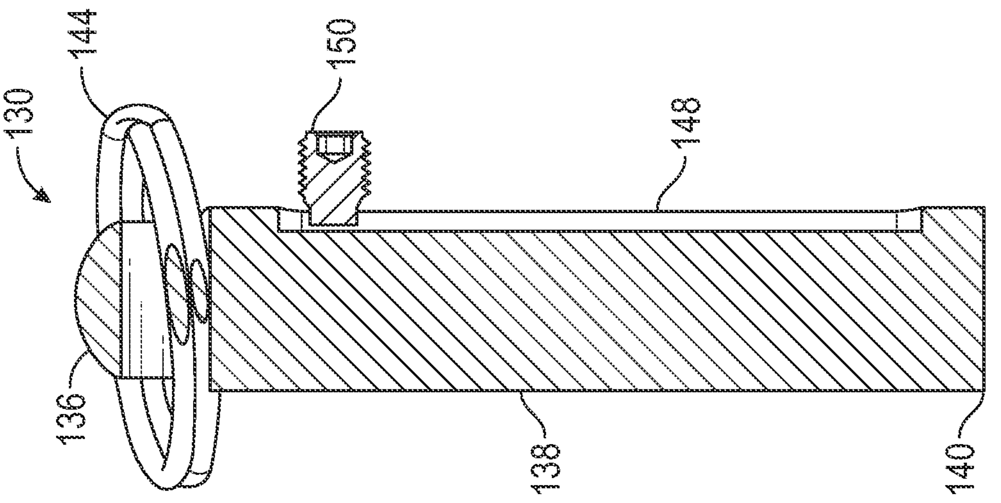
FIG. 9B is a cross sectional view taken along lines 9B-9B of FIG. 9A.
Figure 9A:
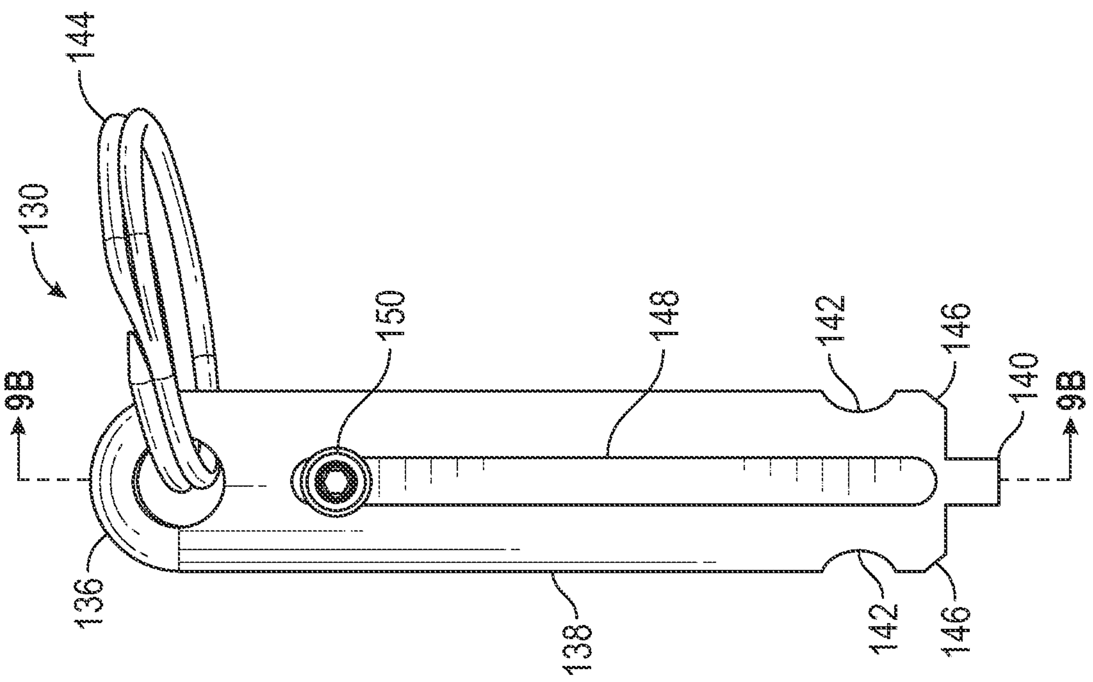
FIG. 9A is an elevational view of an exemplary embodiment of a plunger.
Figure 10A:
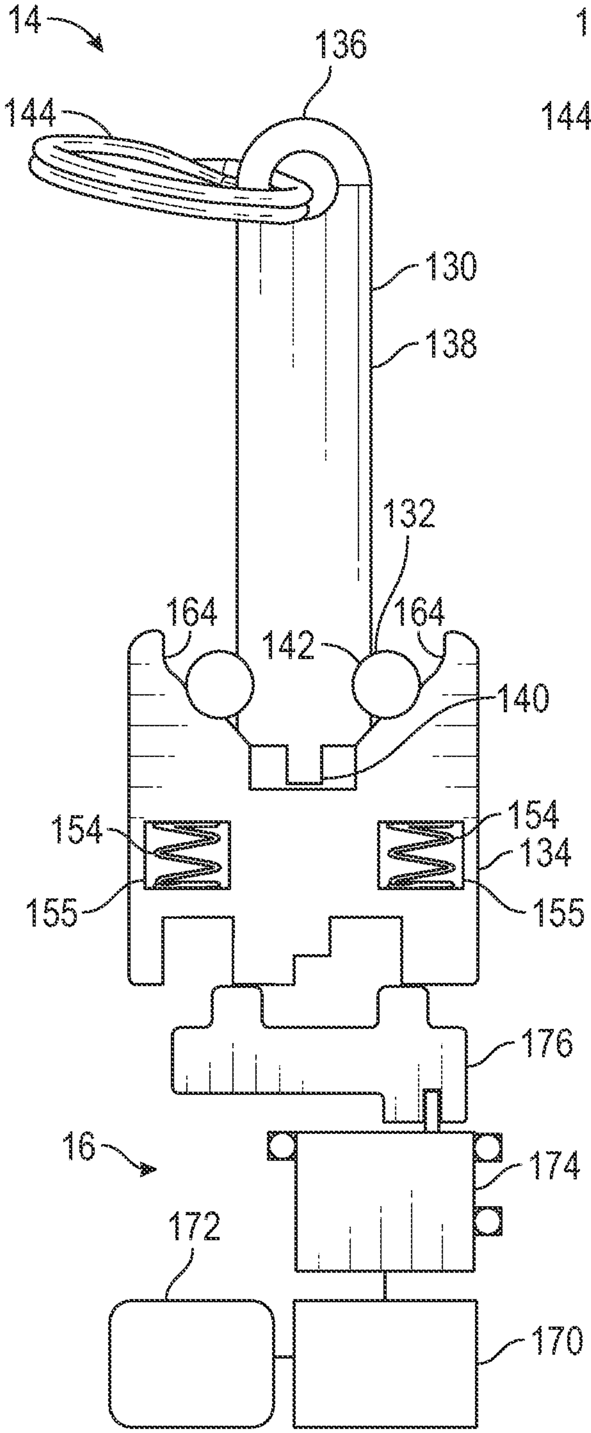
FIG. 10A is a front elevational view of the lock without the housing assembly in a locked position.
Figure 10B:
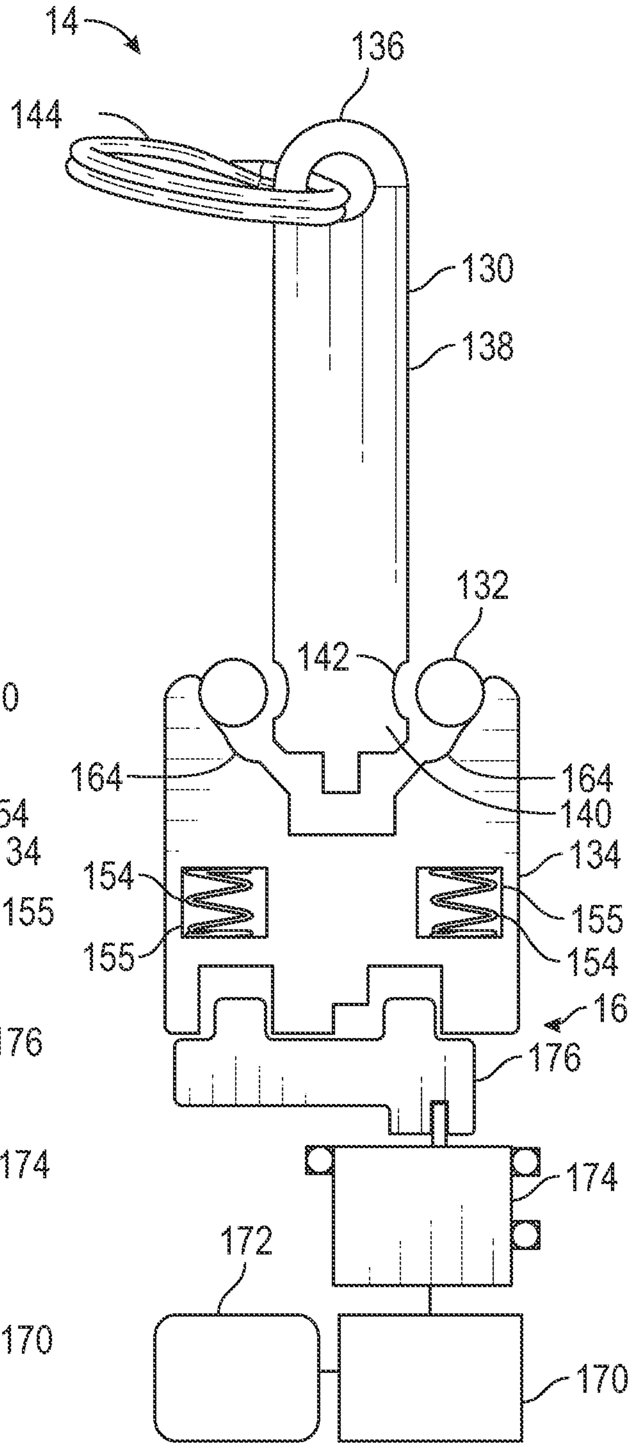
FIG. 10B is a front elevational view of the lock without the housing assembly in an unlocked position.

Turning now to FIGS. 10A and 10B, in one embodiment, the locking assembly 14 comprises a plunger 130, at least one locking member 132, and a locking plate 134. The plunger 130, shown in more detail in FIGS. 9A and 9B, has a first end portion 136, an intermediate portion 138, a second end portion 140, and at least one groove 142 formed in the second end portion 140. The plunger 130 is disposed in the bore 44 and is slidable between a closed position and an open position. In the closed position, the second end portion 140 of the plunger 130 is positioned in the internal cavity 40, the intermediate portion 138 of the plunger extends across the recess 42, and the first end portion 136 of the plunger is positioned proximate to the first end 34 of the housing body 20. The second end portion 140 of the plunger 130 will be interposed between the plunger channel 62 of the back wall 46 and the plunger channel 94 of the front side 80 of the retaining plate 22. The at least one groove 142 is aligned with the locking member channels 64, 96. In one embodiment, the plunger 130 comprises two grooves 142 positioned on diametrically opposing sides of the plunger 130 aligned with each of the locking member channels 64, 96. In the open position, the plunger 130 is withdrawn from the internal cavity 40 and substantially withdrawn from the recess 42.

In one embodiment, the plunger 130 has a cylindrical shape that may be constructed from stainless-steel bar, or other similar material. The diameter of the plunger 130 is slightly smaller than the diameter of the bore 44 such that movement of the plunger 130 within the bore 44 is limited to movement along the longitudinal axis. The first end portion 136 may include a handle 144 that provides the user with structural device to grasp to move the plunger 130 between the open position and closed position. The handle 144 as depicted by the exemplary embodiment comprises a keyring positioned through a hole at the first end portion 136 of the plunger 130. The second end portion 140 may include at least one tapered angle 146. The tapered angle 146 is substantially aligned with the groove 142.

Though the plunger 130 is shown and described as having a substantially cylindrical shape, the plunger 130 may be of any geometric shape freely moveable within the bore 44. Likewise, it will be understood that the bore 44 may be cylindrical, or may be of any other shape suitable for free longitudinal movement of the plunger 130 within the bore 44.

In one embodiment, the plunger 130 has a longitudinal channel 148 along the intermediate portion 138 thereof and wherein the housing assembly 12 further comprises a guide 150 extending from the housing body 20 into the bore 44 and aligned with the longitudinal channel 148 of the plunger 130 to limit the travel of the plunger 130 between the open position and the closed position. The guide 150 may be positioned in the bore 44 between the first end 34 of the housing body 20 and the recess 42. In one embodiment, the guide 150 may comprise a set screw, or other similar type of device. Access to the guide 150 may be provided by a guide hole 152 extending from the second side 32 to the bore 44 between the first end 34 and the recess 42.

The locking member 132 is positioned in the internal cavity 40 extending between the locking member channel 64 of the back wall 46 and the locking member channel 96 of the front side 80 of the retaining plate 22. The locking member 132 is laterally movable between a locking position (FIG. 10A) and an unlocking position (FIG. 10B). In the locking position, the locking member 132 is engaged with the groove 142 of the plunger 130, and in the unlocking position, the locking member 132 is disengaged from the groove 142.

In one embodiment, the locking member 132 may be cylindrical, having a substantially circularly shaped profile, with a radius that substantially conforms to the radius of the groove 142 of the plunger 130. At least a portion of the locking member 132 is contained within each of the locking member channels 64, 96 to ensure the locking member 132 remains aligned with the groove 142 and the housing assembly 12 supports the locking member 132 for movement in a to-and-fro direction.

The locking plate 134 is positioned in the internal cavity 40, interposed between the back wall 46 of the housing body 20 and the front side 80 of the retaining plate 22. The locking plate 134 is positioned between the shelf surface 56 of the back wall 46 and the shelf 102 of the retaining plate 22, which restricts movement of the locking plate 134 in the lateral direction. The locking plate 134 is movable in the longitudinal direction between a lock position (FIG. 10A) and an unlock position (FIG. 10B). The plate guide 66 of the back wall 46 and the plate guide 98 of the retaining plate 22 may engage with the locking plate 134 to support, or otherwise limit the movement of the locking plate 134. In the lock position, the locking plate 134 engages the locking member 132 to hold the locking member 132 in the locking position and maintain engagement with the groove 142 of the plunger 130. In the unlock position, the locking plate 134 is disengaged from the locking member 132 to permit the plunger 130 to move from the closed position to the open position.

The locking assembly 14 may further comprise one or more springs 154 that engage the locking plate 134, such that the locking plate 134 is biased toward the locked position. In one embodiment, the locking plate 134 may include one or more spring guides 155 to at least partially support the springs 154. The spring guide 155 of the locking plate 134 may be aligned with the cutout 100 of the retaining plate 22 when the locking plate 134 is in the locked position. In one embodiment, the springs 154 are at least partially supported within both of the cutout 100 of the retaining plate 22 and the spring guide 155 of the locking plate 134. As the locking plate 134 moves from the locked position toward the unlocked position, the springs 154 are compressed, thereby biasing the locking plate 134 toward the locked position.

Figure 11:
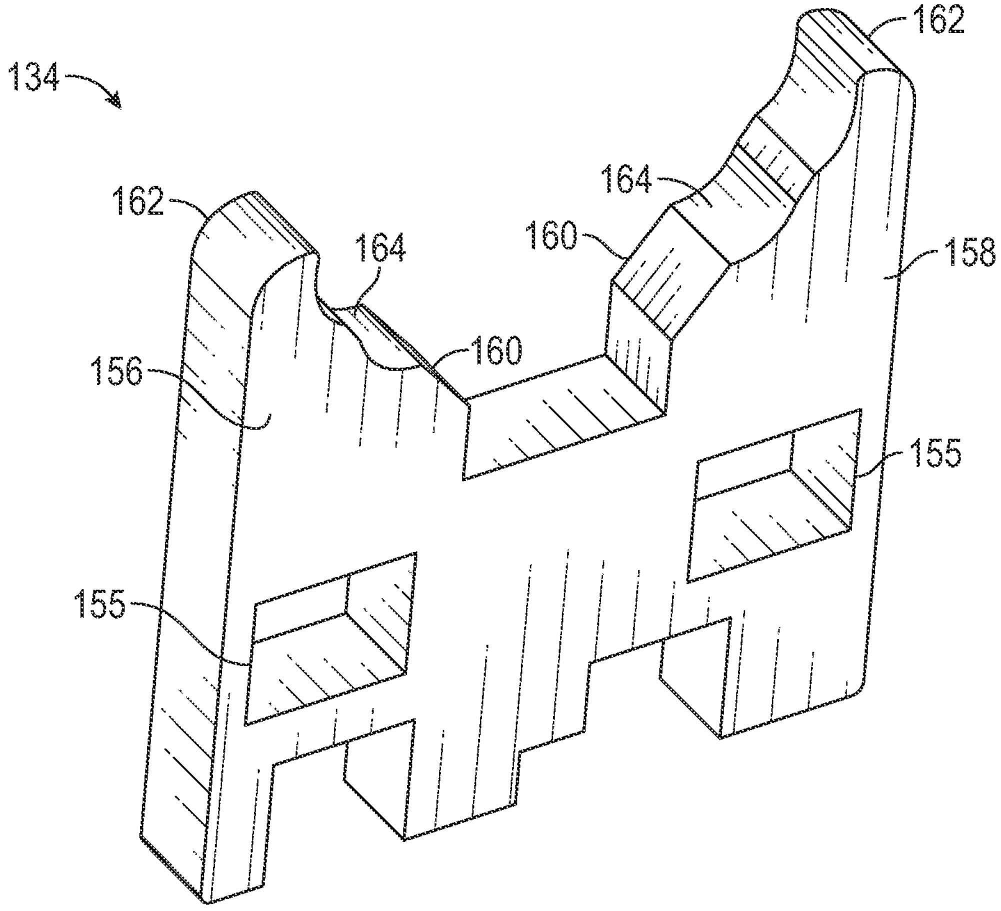
FIG. 11 is perspective view of a locking plate of the lock of FIG. 4.

FIG. 11 illustrates perspective view of an exemplary embodiment of the locking plate 134 for engaging the plunger 130 having two grooves 142 in a diametrically opposing relationship. The locking plate 134 having a first locking member support finger 156 and a second locking member support finger 158 spaced from the first locking member support finger 156. Each of the first locking member support finger 156 and the second locking member support finger 158 having a proximal end 160, a distal end 162, and an inward facing surface 164. Each of the inward facing surfaces 164 is generally angled outwardly from the proximal end 160 toward the distal end 162. In one embodiment, the inward facing surface 164 is curvilinear, such that at least a portion of the inward facing surface 164 proximate to the proximal end 160 and at least a portion of the inward facing surface 164 proximate to the distal end 162 includes a radius that substantially corresponds to the radius of the locking member 132 when the locking plate 134 is in the lock position and the unlock position, respectively.

The control assembly 16 may comprise a controller 170, a power source 172, a servo 174, and a blocking member 176. The control assembly 16 is shown in FIGS. 10A and 10B, with the power source 172 and the controller 170 depicted as a schematic view for reference. The control assembly 16 being operable between a lock mode (FIG. 10A) wherein the locking plate 134 is supported in the locked position and an unlock mode (FIG. 10B) wherein the locking plate 134 is movable to the unlocked position.

The controller 170 may include circuitry, one or more suitably programmed processors (e.g., microprocessors), and associated hardware and software, or hardwired logic. The software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, magnetically based, optically based, and/or the like. The controller 170 is positioned in the internal cavity 40 between the retaining plate 22 and the housing cover plate 26 and may be fixed to the retaining plate 22 by the fastener 60 extending through the second holes 106.

The controller 170 may further include a transceiver (not shown) operable to receive at least a first signal and a second signal from a user device (not shown). The user device may include any electronic device capable of sending and receiving electronic signals, such as a smartphone, tablet, computer, and other similar type of device. The electronic signal may be transmitted in a variety of forms, including but not limited to, wireless communications (e.g., near-field communication, Bluetooth, WIFI, RF, cellular network communications, and the like), or a combination thereof. The first signal including instructions for the control assembly 16 to operate in the lock mode and the second signal including instructions for the control assembly 16 to operate in the unlock mode. In one embodiment, the transceiver is operable to transmit a third signal to a user device, the third signal indicating that the plunger 130 was moved from the closed position to the open position while the control assembly 16 was in the lock mode.

In one embodiment, the controller 170 may include a plurality of sensors to determine the status of the plunger 130. The plurality of sensors may include a proximity sensor that determines whether the plunger 130 is positioned in the closed position or open position. The controller 170 may only allow the control assembly 16 to operate in the locked mode if the plunger 130 is in the closed position. The plurality of sensors may also include an anti-tampering sensor that detects any effort to defeat the lock 10. The controller 170 may cause the transceiver to transmit the status of the lock 10 to the user device.

Electrical power is provided to the control assembly 16, and specifically to the controller 170 to operate the control assembly 16, by the power source 172. The power source 172 is positioned in the power source compartment 70 of the internal cavity 40. Nonexclusive examples of the power source 172 can include a nickel metal hydride battery, a nickel cadmium battery, or a lithium-ion battery.

The servo 174 and the blocking member 176 are positioned in the internal cavity 40 between the back wall 46 of the housing body 20 and the front side 80 of the retaining plate 22. The servo 174 may be secured to the back wall 46 of the housing body 20 between the locking plate 134 and the power source compartment 70 with the blocking member 176 positioned between the servo 174 and the locking plate 134.

The servo 174 is electrically coupled to the controller 170 and the blocking member 176 is coupled to the servo 174. The servo 174 is operable to selectively position the blocking member 176 between a first position (FIG. 10A) and a second position (FIG. 10B). When the blocking member 176 is in the first position, the blocking member 176 supports the locking plate 134 in the lock position thereof. When the servo 174 has moved the blocking member 176 to the second position, the blocking member 176 is disengaged from the locking plate 134, so the locking plate 134 is movable from the lock position to the unlock position. The plate guides 66, 98 may engage with the blocking member 176 to support, or otherwise limit the movement of the blocking member 176 between the first position and second position.

In one embodiment, the control assembly 16 is operable to transition between the lock mode and unlock mode by way of one or more of: an electronic signal, a wireless signal, an optical signal, a biometric locking mechanism, a key operated locking mechanism, and combination dial locking mechanism.

Figure 12A:
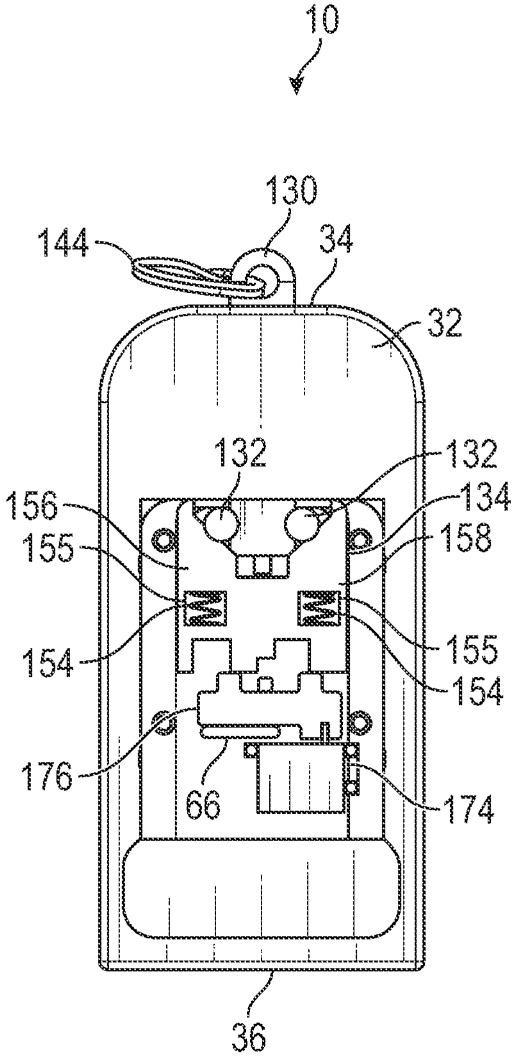
FIG. 12A is a front elevational view of the lock in a closed and a locked position.
Figure 12B:
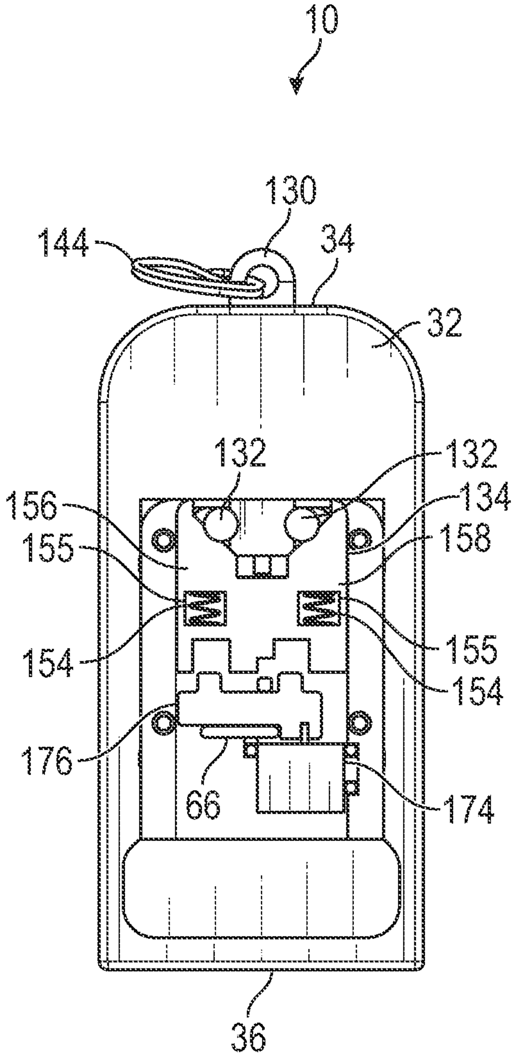
FIG. 12B is a front elevational view of the lock in a closed and an unlocked position.
Figure 12C:
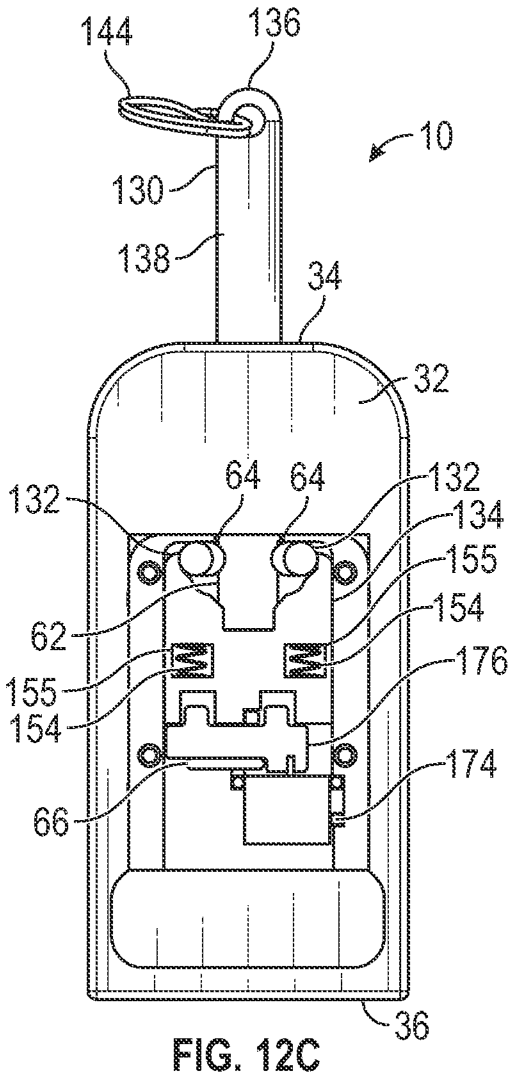
FIG. 12C is a front elevational view of the lock in an open and an unlocked position.
Figure 12D:
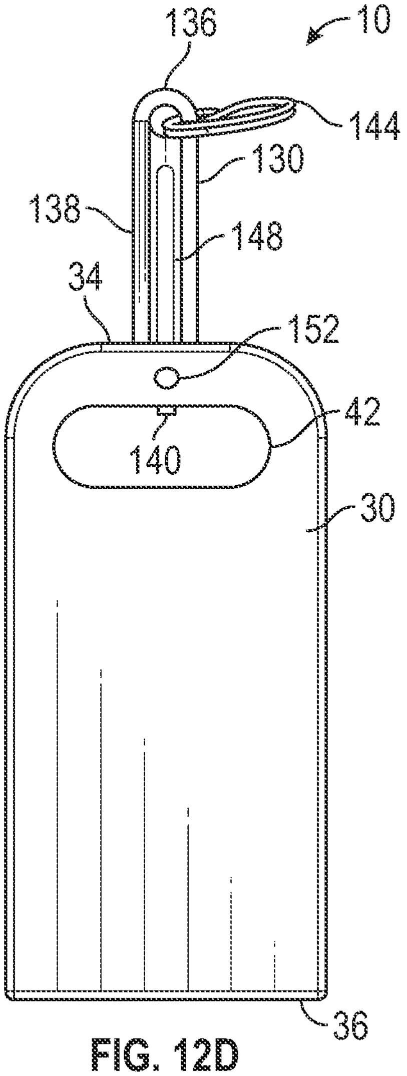
FIG. 12D is a rear elevational view of the lock in an open and an unlocked position

Turning now FIGS. 13A-13B, an example of one embodiment of the lock 10 in use in accordance with the present disclosure will be described. FIGS. 12A-12D will be referenced regarding the mechanics of the lock 10, which depict the lock 10 with the housing cover plate 26, the anti-tampering plate 24, and the retaining plate 22 having been removed from the housing body 20 for clarity.

Figure 13A:
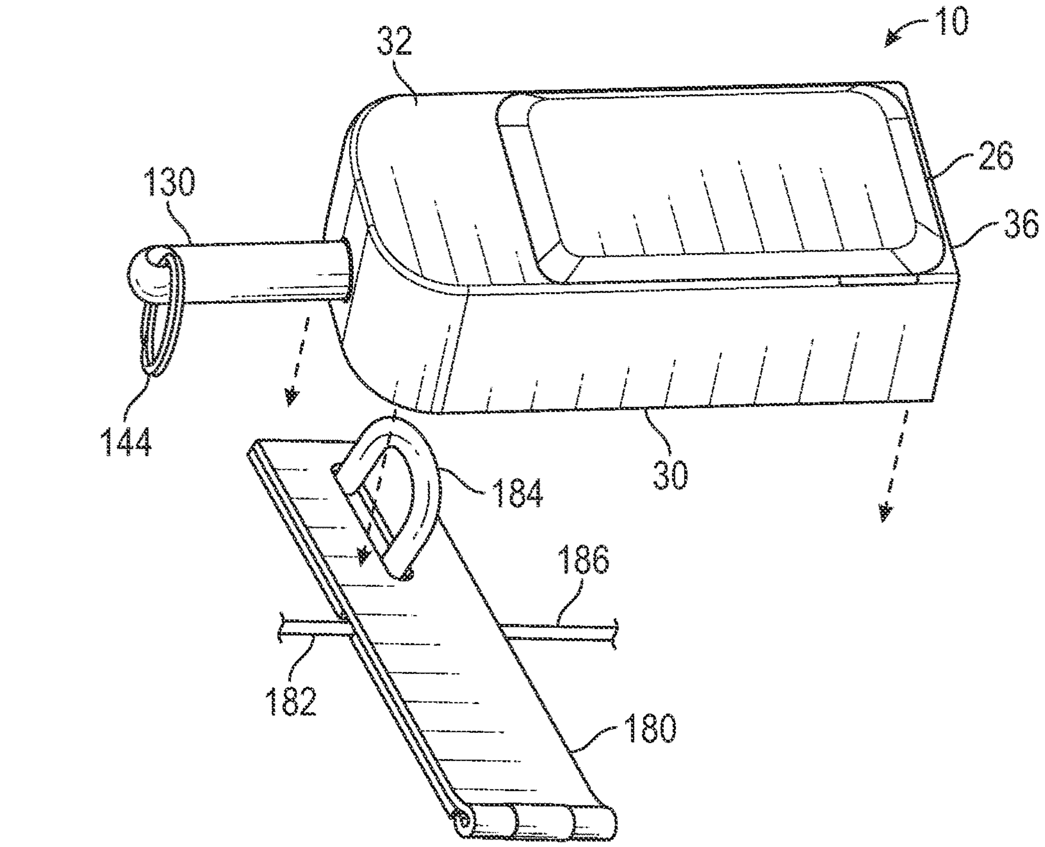
FIG. 13A is a perspective view of the lock shown before being attached to a hasp and a staple.
Figure 13B:
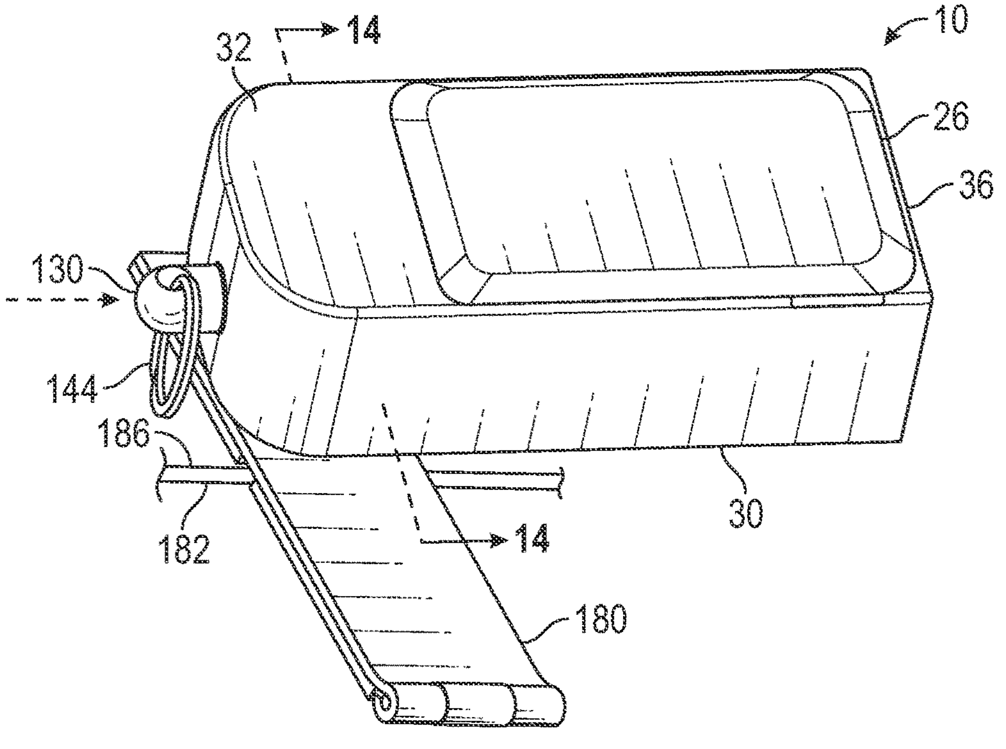
FIG. 13B is a perspective view of the lock shown attached to the hasp and the staple of FIG. 13A.

As shown in FIG. 13A, an exemplary object having a hasp 180 attached to a first surface 182 and a staple 184 attached to a second surface 186 is presented with a need to secure the exemplary object using the hasp 180 and staple 184. The lock 10 is configured with the plunger 130 in the open position (FIGS. 12C and 12D), such that the second end portion 140 of the plunger 130 is withdrawn from the internal cavity 40 and substantially withdrawn from the recess 42, and the control assembly 16 is in the unlocked mode. The lock 10 is positioned with the first side 30 of the housing body 20 facing the hasp 180 and staple 184, having the recess 42 directly aligned with the staple 184. The lock 10 is then repositioned, such that the staple 184 is received by the recess 42 with the opening of the staple 184 substantially aligned with the plunger 130.

The user manually moves the plunger 130 to be repositioned from the open position to the closed position, causing the plunger 130 to intersect the opening of the staple 184. As the plunger 130 enters the internal cavity 40 the tapered angle 146 at the second end portion 140 of the plunger 130 engage with the locking members 132. The axial movement of the plunger 130 causes the locking members 132 to move outwardly and apply a force on the inward facing surfaces 164 of the first locking member support finger 156 and the second locking member support finger 158. The force causes the locking plate 134 to move from the locked position to the unlocked position.

The springs 154 engaged with the locking plate 134 causes the locking plate 134 to be biased toward the locked position, thereby causing the inward facing surface 164 of the first locking member support finger 156 and the second locking member support finger 158 to maintain a constant inward pressure on the locking members 132. The locking members 132 will move inward to engage the grooves 142 of the plunger 130, once the plunger 130 is seated in the closed position (FIG. 12B). The transceiver may then receive the first signal from the user device, the first signal including instructions for the control assembly 16 to operate in the lock mode. The controller 170 will instruct the servo 174 to position the blocking member 176 in the first position, wherein the blocking member 176 supports the locking plate 134 in the lock position (FIG. 12A). The exemplary object will be protected from anyone attempting to defeat the lock 10 having the plunger 130 and the staple 184 within the recess 42 of the housing body 20 and inaccessible to unauthorized users.

When the user is ready to gain access to the exemplary object, the user may cause the user device to send the second signal to be received by the transceiver, wherein the second signal includes instructions for the control assembly 16 to operate in the unlock mode. The controller 170 will then direct the servo 174 to move the blocking member 176 into the second position (FIG. 12B). With the blocking member 176 in the second position, the blocking member 176 is disengaged from the locking plate 134 so the locking plate 134 is movable from the lock position to the unlock position. The user may use the handle 144 at the first end portion 136 of the plunger 130 to move the plunger 130 from the closed position toward the open position. As the plunger 130 is moved from the closed position to the open position, the axial movement causes the locking members 132 to move outwardly and apply a force on the inward facing surfaces 164 of the first locking member support finger 156 and the second locking member support finger 158. The force from applied to the first locking member support finger 156 and the second locking member support finger 158 cause the locking plate 134 to move from the locked position to the unlocked position and permit the locking members 132 to disengage from the grooves 142 of the plunger 130. With the plunger 130 in the open position (FIGS. 12C and 12D), the lock 10 can be removed from the hasp 180 and staple 184, and the user will have access to the exemplary object.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed herein.

What is claimed is:

1. A lock, comprising:

a housing having a first side, a second side opposite the first side, a first end, a second end opposite the first end, an internal cavity, a recess extending from the first side toward the second side, and a bore extending from the first end toward the second end so as to intersect the recess and the internal cavity;

a plunger having a first end portion, an intermediate portion, a second end portion, and at least one groove formed in the second end portion, the plunger disposed in the bore and slidable between a closed position wherein the second end of the plunger is positioned in the internal cavity and the intermediate portion of the plunger extends across the recess and an open position wherein the plunger is withdrawn from the internal cavity and the recess;

at least two locking members positioned in the internal cavity and movable between a locking position wherein the locking member is engaged with the at least one groove of the plunger and an unlocking position wherein the locking member is disengaged from the at least one groove, the at least two locking members supported on diametrically opposing sides of the plunger;

a locking plate positioned in the internal cavity and movable between a lock position wherein the locking plate engages the locking member to hold the locking member in the locking position to maintain the locking member engaged with the groove of the plunger and an unlock position wherein the locking plate is disengaged from locking member to permit the plunger to move from the closed position to the open position; and a control assembly operable between a lock mode wherein the locking plate is supported in the locked position and an unlock mode wherein the locking plate is movable to the unlocked position, wherein the locking plate has a first locking member support finger and a second locking member support finger spaced from the first locking member support finger, each of the first locking member support finger and the second locking member support finger having a proximal end, a distal end, and an inward facing surface, each of the inward facing surfaces generally angled outwardly from the proximal end toward the distal end so when the control assembly is in the lock mode, the first locking member support finger engages one of the locking members when one of the locking members is engaged with the at least one groove of the plunger and the second locking member support finger engages another one of the locking members with the other locking member is engaged with the at least one groove of the plunger, and so when the control assembly is in the unlock mode, axial movement of the plunger from the closed position toward the open position causes the locking members to move outwardly and apply a force on the inward facing surfaces of the first locking member support finger and the second locking member support finger to cause the locking plate to move from the locked position to the unlocked position and permit the locking members to disengage from the at least one groove of the plunger.

2. The lock of claim 1, further comprising:

a transceiver operable to receive at least a first signal and a second signal from a user device, the first signal including instructions for the control assembly to operate in the lock mode and the second signal including instructions for the control assembly to operate in the unlock mode.

3. The lock of claim 2, wherein the transceiver is operable to transmit a third signal to a user device, the third signal indicating that the plunger was moved from the closed position to the open position while the control assembly was in the lock mode.

4. The lock of claim 2, wherein the control assembly further comprises a servo coupled to the transceiver and a blocking member coupled to the servo, the servo operable to selectively position the blocking member between a first position, wherein the blocking member supports the locking plate in the lock position thereof, and a second position wherein the blocking member is disengaged from the locking plate so the locking plate is movable from the lock position to the unlock position.

5. The lock of claim 1, wherein the plunger has at least two grooves formed in the second end portion in a diametrically opposing relationship.

6. The lock of claim 1, wherein at least a portion of the inward facing surface is curvilinear, and wherein the locking members have a substantially circularly shaped profile.

7. The lock of claim 1, wherein the locking plate is biased in the locked position.

8. The lock of claim 1, wherein the locking members extend laterally across the internal cavity of the housing so the housing supports the locking members for movement in a to-and-fro direction.

9. The lock of claim 1, wherein the plunger has a longitudinal channel along the intermediate portion thereof and wherein the lock further comprises a guide extending from the housing into the bore and the longitudinal channel of the plunger to limit the travel of the plunger between the open position and the closed position.

10. The lock of claim 1, wherein the control assembly is operable to transition between the lock mode and the unlock mode by way of one or more of: an electronic signal, a wireless signal, an optical signal, a biometric locking mechanism, a key operated locking mechanism, and combination dial locking mechanism.

11. The lock of claim 1, wherein the recess of the housing has an open end and a closed end opposite the open end.

12. The lock of claim 1, further comprising:

a housing plate positioned along the second side proximate to the internal cavity providing restricted access to the internal cavity.

* * * * *